US012606135B2

(12) United States Patent
Fukudome

(10) Patent No.: US 12,606,135 B2
(45) Date of Patent: Apr. 21, 2026

(54) DECELERATION TURNING ASSISTANCE DEVICE, TOWED VEHICLE AND COUPLED VEHICLES

(71) Applicant: TOYOTA JIDOSHA KABUSHIKI KAISHA, Toyota (JP)

(72) Inventor: Hideki Fukudome, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 430 days.

(21) Appl. No.: 18/300,916

(22) Filed: Apr. 14, 2023

(65) Prior Publication Data

US 2023/0398968 A1 Dec. 14, 2023

(30) Foreign Application Priority Data

Jun. 10, 2022    (JP) ................................. 2022-094686

(51) Int. Cl.
    *B60T 8/32*      (2006.01)
    *B60T 7/20*      (2006.01)
    *B60T 13/68*     (2006.01)
    *B60W 10/188*    (2012.01)
    *B60W 30/045*    (2012.01)

(52) U.S. Cl.
    CPC ................ *B60T 8/323* (2013.01); *B60T 7/20* (2013.01); *B60T 13/686* (2013.01); *B60W 10/188* (2013.01); *B60W 30/045* (2013.01); *B60W 2300/14* (2013.01); *B60W 2520/22* (2013.01); *B60W 2710/182* (2013.01)

(58) Field of Classification Search
    CPC .......... B60T 8/323; B60T 7/20; B60T 13/686; B60W 10/188; B60W 30/045; B60W 2300/14; B60W 2520/22; B60W 2710/182; B60W 10/184; B60W 30/18109; B60W 30/18145
    USPC .......................................................... 701/70
    See application file for complete search history.

(56) References Cited

U.S. PATENT DOCUMENTS

| | | | |
|---|---|---|---|
| 5,295,736 A | 3/1994 | Brearley | |
| 6,450,019 B1 | 9/2002 | Wetzel et al. | |
| 2012/0029782 A1 | 2/2012 | Suda | |

FOREIGN PATENT DOCUMENTS

| | | | | |
|---|---|---|---|---|
| JP | 05-310111 A | | 11/1993 | |
| JP | 10236289 A | * | 9/1998 | ............... B60T 7/12 |
| JP | 2000-198430 A | | 7/2000 | |
| JP | 2004130957 A | * | 4/2004 | |
| JP | 2017-132343 A | | 8/2017 | |

(Continued)

OTHER PUBLICATIONS

JP-10236289-A (Nakamura et al.) (Sep. 8, 1998) (Machine Translation) (Year: 1998).*

*Primary Examiner* — Logan M Kraft
(74) *Attorney, Agent, or Firm* — Sughrue Mion, PLLC

(57) ABSTRACT

A deceleration turning assistance device, includes: braking devices respectively provided at each of a left wheel and a right wheel of a towed vehicle that is configured to be pivotably coupled to a towing vehicle via a coupling portion; and a braking force difference generating portion that, in a case of decelerated turning in a state in which the towed vehicle is coupled to the towing vehicle, is configured to generate a left-right braking force difference between the braking devices in accordance with a hitch angle between the towing vehicle and the towed vehicle so as to decrease the hitch angle.

6 Claims, 10 Drawing Sheets

(56) References Cited

FOREIGN PATENT DOCUMENTS

| WO | 2010/087022 A1 | 8/2010 | |
| WO | WO-2010106643 A1 * | 9/2010 | ............... B60T 7/20 |

* cited by examiner

DECELERATION TURNING ASSISTANCE DEVICE, TOWED VEHICLE AND COUPLED VEHICLES

CROSS-REFERENCE TO RELATED APPLICATION

This application is based on and claims priority under 35 USC 119 from Japanese Patent Application No. 2022-094686 filed on Jun. 10, 2022, the disclosure of which is incorporated by reference herein.

BACKGROUND

Technical Field

The present disclosure relates to a deceleration turning assistance device, a towed vehicle, and coupled vehicles.

Related Art

Japanese Patent Application Laid-Open (JP-A) No. H5-310111 describes a braking control system for a trailer in which braking of a trailer is corrected from a towing vehicle side by adjusting a braking pressure signal formed at the towing vehicle side in response to a request from a driver and a measurement value of a longitudinal force acting on a trailer coupling immediately before braking and during braking.

In coupled vehicles in which a towed vehicle (trailer) is pivotably coupled to a towing vehicle (tractor) via a coupling portion, when the towing vehicle and the towed vehicle turn, a relative angle (hitch angle) around the coupling portion is generated between the towing vehicle and the towed vehicle, enabling the turning motion. However, in a state in which the towing vehicle is decelerating and a hitch angle has arisen between the towing vehicle and the towed vehicle (this state is referred to herein as "in a case of decelerated turning"), the hitch angle between the towing vehicle and the towed vehicle is a factor for unstable behavior such as bending of the coupled vehicles (jackknife phenomenon). On the other hand, although the technology described in Japanese Patent Application Laid-Open (JP-A) No. H5-310111 corrects the braking force of the towed vehicle by decelerating during braking and using the pressure at the coupling portion, Japanese Patent Application Laid-Open (JP-A) No. H5-310111 does not describe correcting the braking force of the towed vehicle so as to suppress unstable behavior in a case of decelerated turning.

SUMMARY

The present disclosure has been made in consideration of the above circumstances, and an object thereof is to provide a deceleration turning assistance device, a towed vehicle, and coupled vehicles which are capable of improving stability in a case of decelerated turning of coupled vehicles.

A deceleration turning assistance device according to a first aspect includes: braking devices respectively provided at each of a left wheel and a right wheel of a towed vehicle that is configured to be pivotably coupled to a towing vehicle via a coupling portion; and a braking force difference generating portion that, in a case of decelerated turning in a state in which the towed vehicle is coupled to the towing vehicle, is configured to generate a left-right braking force difference between the braking devices in accordance with a hitch angle between the towing vehicle and the towed vehicle so as to decrease the hitch angle.

In the deceleration turning assistance device according to the first aspect, in a case of decelerated turning in a state in which the towed vehicle is coupled to the towing vehicle, a left-right braking force difference between the braking devices respectively provided at each of the left wheel and the right wheel of the towed vehicle is generated in accordance with the hitch angle between the towing vehicle and the towed vehicle so as to decrease the hitch angle. This enables a moment in a direction that decreases the hitch angle between the towing vehicle and the towed vehicle to be generated at the towed vehicle in a case of decelerated turning and unstable behavior such as bending of the coupled vehicles to be suppressed, thereby enabling stability in a case of decelerated turning of the coupled vehicles, in which the towing vehicle and the towed vehicle are pivotably coupled via the coupling portion, to be improved.

A deceleration turning assistance device according to a second aspect is the deceleration turning assistance device according to the first aspect, wherein the braking force difference generating portion includes: a displacement portion that is configured to be displaced in a case of decelerated turning, in accordance with the hitch angle; and a transmitting portion that is configured to transmit displacement of the displacement portion to the braking devices so as to generate the left-right braking force difference between the braking devices, which decreases the hitch angle.

In the deceleration turning assistance device according to the second aspect, the displacement portion is displaced in a case of decelerated turning, in accordance with the hitch angle between the towing vehicle and the towed vehicle, and the displacement is transmitted to the braking devices by the transmitting portion, thereby generating a left-right braking force difference that decreases the hitch angle between the towing vehicle and the towed vehicle. This enables stability in a case of decelerated turning of the coupled vehicles to be improved with a simple configuration that does not require a control portion or the like.

A deceleration turning assistance device according to a third aspect is the deceleration turning assistance device according to the second aspect, wherein the transmitting portion includes: a first converting portion that is configured to convert displacement of the displacement portion to a pulling force of a first wire in a case of decelerated rightward turning, and to increase a braking force generated at a braking device at the right wheel of the towed vehicle by the pulling force of the first wire; and a second converting portion that is configured to convert displacement of the displacement portion to a pulling force of a second wire in a case of decelerated leftward turning, and to increase a braking force generated at a braking device at the left wheel of the towed vehicle by the pulling force of the second wire.

In the deceleration turning assistance device according to the third aspect, in a case in which the braking devices are mechanical, stability in a case of decelerated turning of the coupled vehicles can be improved with a simple configuration.

A deceleration turning assistance device according to a fourth aspect is the deceleration turning assistance device according to the second aspect, wherein the transmitting portion includes: a third converting portion that is configured to convert displacement of the displacement portion to hydraulic pressure in a case of decelerated rightward turning, and to increase a braking force generated at a braking device at the right wheel of the towed vehicle by the hydraulic pressure; and a fourth converting portion that is configured to convert displacement of the displacement portion to hydraulic pressure in a case of decelerated leftward turning, and to increase a braking force generated at a braking device at the left wheel of the towed vehicle by the hydraulic pressure.

In the deceleration turning assistance device according to the fourth aspect, in a case in which the braking devices are hydraulic, stability in a case of decelerated turning of the coupled vehicles can be improved with a simple configuration.

A deceleration turning assistance device according to a fifth aspect is the deceleration turning assistance device according to the first aspect, wherein the braking force difference generating portion includes: a hitch angle detection portion that is configured to detect the hitch angle; and a control portion that, in a case of decelerated turning, is configured to generate the left-right braking force difference between the braking devices in accordance with the hitch angle detected by the hitch angle detection portion so as to decrease the hitch angle between the towing vehicle and the towed vehicle.

The deceleration turning assistance device according to the fifth aspect enables stability in a case of decelerated turning of the coupled vehicles to be improved.

A towed vehicle according to a sixth aspect includes the deceleration turning assistance device according to any one of the first aspect to fifth aspect, wherein the towed vehicle is configured to be pivotably coupled to a towing vehicle via a coupling portion.

Since the towed vehicle according to the sixth aspect includes the deceleration turning assistance device of any one of the first aspect to the fifth aspect, similarly to the first aspect, stability in a case of decelerated turning of the coupled vehicles can be improved.

Coupled vehicles according to a seventh aspect include: the towed vehicle according to the sixth aspect; and a towing vehicle that is configured to be pivotably coupled to the towed vehicle via the coupling portion.

Since the coupled vehicles according to the seventh aspect include the towed vehicle according to the sixth aspect, similarly to the sixth aspect, stability in a case of decelerated turning of the coupled vehicles can be improved.

The present disclosure has an advantageous effect of enabling stability in a case of decelerated turning of coupled vehicles to be improved.

BRIEF DESCRIPTION OF THE DRAWINGS

Exemplary embodiments of the present disclosure will be described in detail based on the following figures, wherein.

DETAILED DESCRIPTION

Detailed explanation follows of an example of an exemplary embodiment of the present disclosure, with reference to the drawings.

First Exemplary Embodiment

Figure 1:
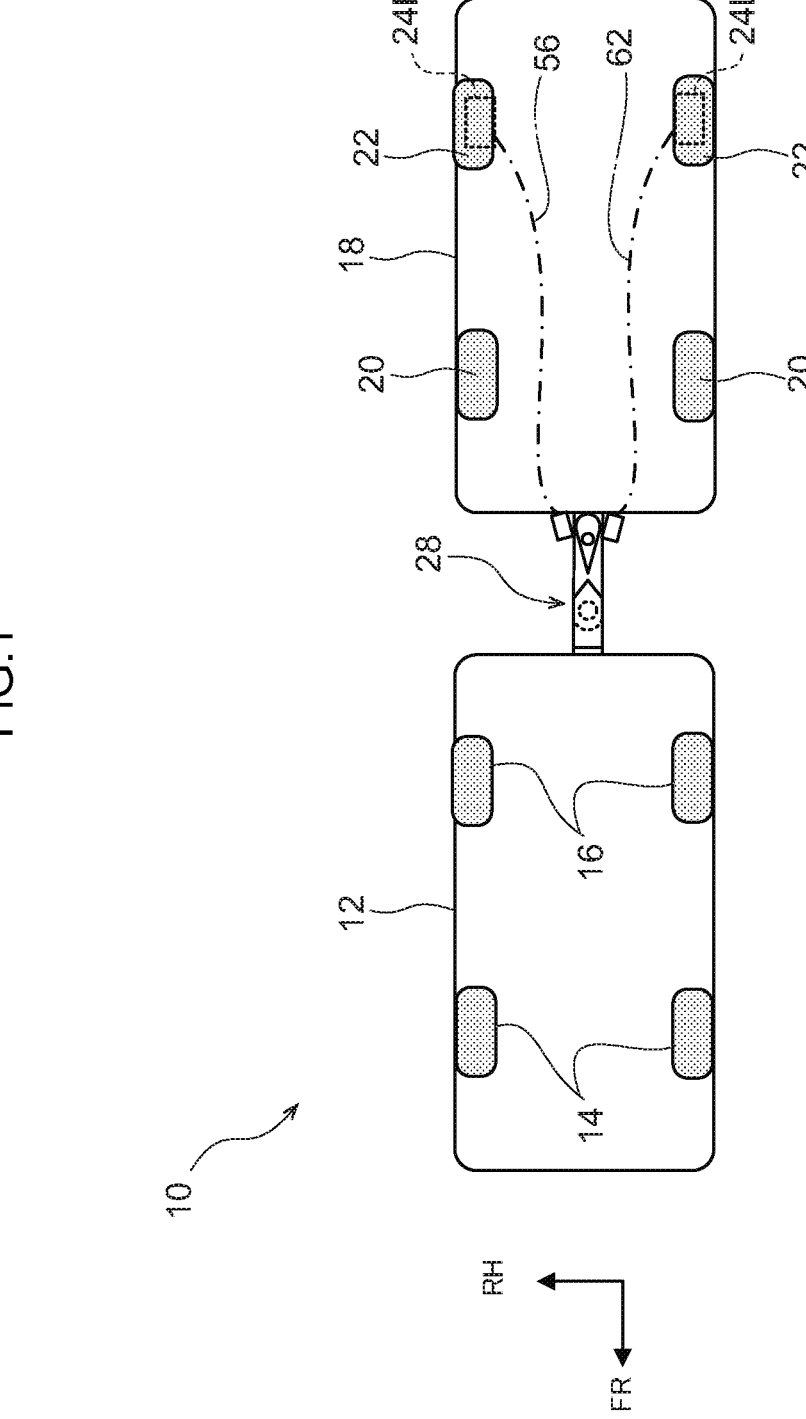
FIG. 1 is a plan view of coupled vehicles according to a first exemplary embodiment.
Figure 2:
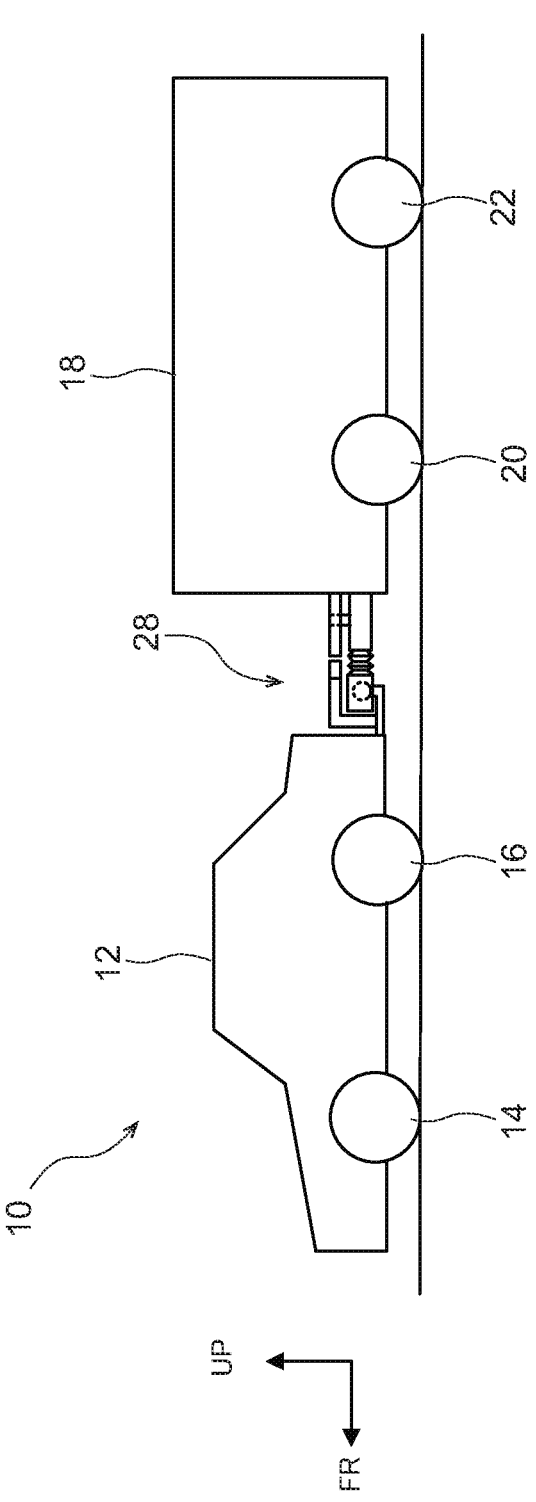
FIG. 2 is a side view of coupled vehicles according to the first exemplary embodiment.

FIG. 1 and FIG. 2 show coupled vehicles 10 according to a first exemplary embodiment. The coupled vehicles 10 are configured such that a towing vehicle 12 and a towed vehicle 18 are coupled so as to be pivotable about an axis extending in a vertical direction via a coupling portion 28, which is described below in detail. Note that the coupling between the towing vehicle 12 and the towed vehicle 18 via the coupling portion 28 can be released by a predetermined procedure while the coupled vehicles 10 are stationary.

The towing vehicle 12 includes a left and right pair of front wheels 14 disposed at a front side of a vehicle body, and a left and right pair of rear wheels 16 disposed at a rear side of the vehicle body. The front wheels 14 are connected to a steering device (not illustrated) installed at the towing vehicle 12, and are steered in response to rotation of a steering wheel when a non-illustrated steering wheel provided at the towing vehicle 12 is rotated.

A drive source (not illustrated), which is configured by an engine or a motor, is installed at the towing vehicle 12. At least one of the front wheels 14 or the rear wheels 16 are driven by the drive source, and the drive force generated by the drive source is transmitted and rotated, thereby causing the towing vehicle 12 to travel. Moreover, the towing vehicle 12 is provided with braking devices (not illustrated) at the front wheels 14 and the rear wheels 16, respectively, and when a non-illustrated brake pedal provided at the towing vehicle 12 is depressed, braking forces are generated at the braking devices at the respective wheels 14 and 16, thereby decelerating the towing vehicle 12.

The towed vehicle 18 includes a left and right pair of front wheels 20 disposed at a front side of a vehicle body, and a left and right pair of rear wheels 22 disposed at a rear side of the vehicle body. A steering device and a drive source are not installed at the towed vehicle 18, and the front wheels 20 and the rear wheels 22 are rotatably supported by the vehicle body. Further, mechanical braking devices 24L and 24R are provided at the left and right rear wheels 22 of the towed vehicle 18. Note that the braking devices 24L and 24R may be drum brakes or disc brakes.

Figure 3:
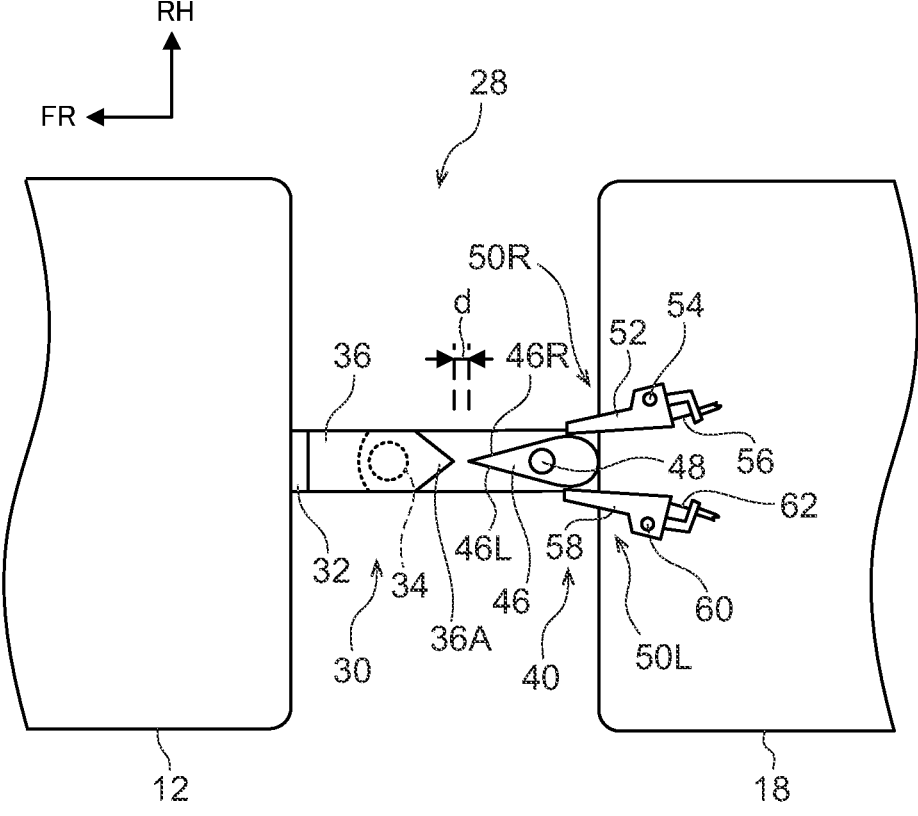
FIG. 3 is a plan view of a coupling portion according to the first exemplary embodiment.
Figure 4:
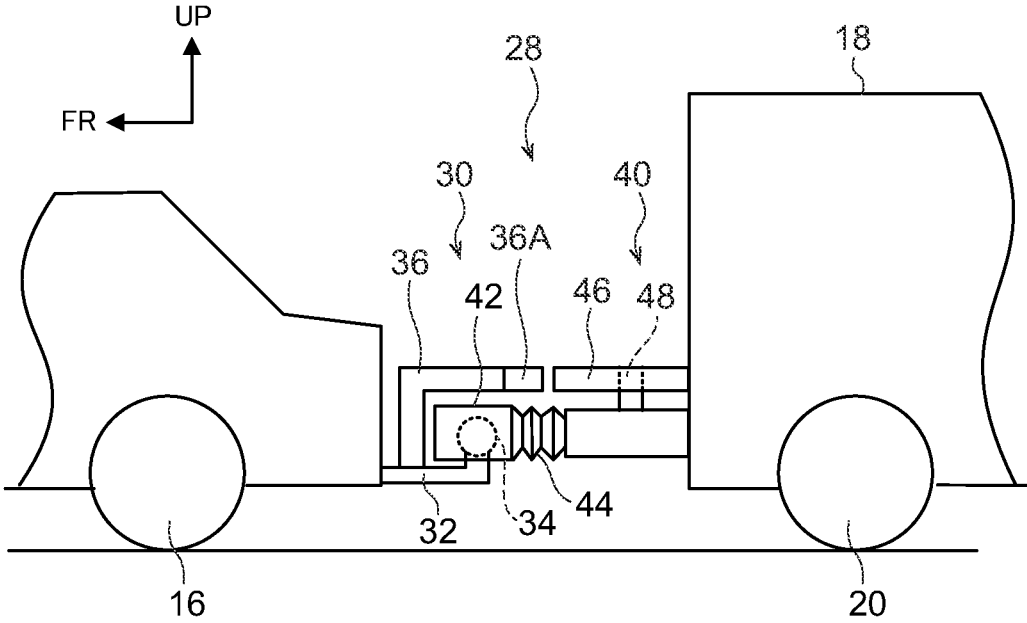
FIG. 4 is a side view of a coupling portion according to the first exemplary embodiment.

As illustrated in FIG. 3 and FIG. 4, the coupling portion 28 includes a first coupling member (hitch member) 30 that is attached to the towing vehicle 12 so as to project rearward of the towing vehicle 12 from a rear end of the towing vehicle 12, and a second coupling member 40 that is provided at the towed vehicle 18 so as to project forward of the towed vehicle 18 from a front end of the towed vehicle 18.

The first coupling member 30 includes a base portion 32 that is substantially L-shaped in side view, and a hitch ball 34 that serves as a pivot center of the towing vehicle 12 and the towed vehicle 18 is attached to a distal end portion of the base portion 32. A guide member 36 is provided upright at an intermediate portion of the base portion 32. An intermediate portion of the guide member 36 is bent rearward of the towing vehicle 12, and a protrusion 36A protruding rearward of the towing vehicle 12 is formed at a distal end portion of the guide member 36.

A coupler 42 that engages with the hitch ball 34 is attached to a distal end portion of the second coupling member 40, and an extending and contracting portion 44 that incorporates a damper and is capable of extending and contracting is provided at an intermediate portion of the second coupling member 40. The extending and contracting portion 44 is in an extended state when the towing vehicle 12 is accelerating or traveling at a constant speed during travel of the coupled vehicles 10, and is in a contracted state when the towing vehicle 12 is decelerating.

Although not illustrated in the drawings, the towed vehicle 18 is provided with an inertia brake mechanism. The inertia brake mechanism is a mechanism that transmits displacement by which the extending and contracting portion 44 contracts during deceleration of the towing vehicle 12 to the braking devices 24L and 24R using non-illustrated rods or the like, and causes the braking devices 24L and 24R to generate a braking force that is equal on light and right sides.

Moreover, the second coupling member 40 includes a rotation member 46 that is approximately raindrop-shaped and in which inclined surfaces 46L and 46R are formed between an acute-angled distal end portion and an arc-shaped rear end portion. The rotation member 46 is supported by a pin 48 so as to be rotatable about an axis extending in the vertical direction. The rotation member 46 is disposed so that the distal end portion faces approximately forward of the towed vehicle 18, and a gap d is formed between the distal end portion and the protrusion 36A of the guide member 36 in a state in which the extending and contracting portion 44 is extended.

A displacement converting portion 50R is provided at the right side of the towed vehicle 18 and a displacement converting portion 50L is provided at the left side of the towed vehicle 18, in the vicinity of the arc-shaped rear end portion of the rotation member 46. As illustrated in FIG. 3, the displacement converting portion 50R includes a lever 52 that is pivotally supported about a pin 54. One end of a first wire 56 is locked to a base portion of the lever 52, and a distal end portion of the lever 52 abuts a right side surface of a rear end side of the rotation member 46. The other end of the first wire 56 is connected to the braking device 24R so as to generate a braking force at the braking device 24R when the first wire 56 is pulled (see FIG. 1).

The displacement converting portion 50L further includes a lever 58 that is pivotally supported about a pin 60. One end of a second wire 62 is locked to a base portion of the lever 58, and a distal end portion of the lever 58 abuts a left side surface of the rear end side of the rotation member 46. The other end of the second wire 62 is connected to the braking device 24L so as to generate a braking force at the braking device 24L when the second wire 62 is pulled.

Note that in the first exemplary embodiment, the braking devices 24L and 24R are examples of braking devices in the present disclosure, and the rotation member 46, the displacement converting portion 50R including the first wire 56, and the displacement converting portion 50L including the second wire 62 are examples of a braking force difference generating portion in the present disclosure. Further, in the first exemplary embodiment, the rotation member 46 is an example of a displacement portion in the present disclosure, and the displacement converting portions 50L and 50R are examples of a transmitting portion in the present disclosure. Moreover, in the first exemplary embodiment, the displacement converting portion 50R is an example of a first converting portion in the present disclosure, and the displacement converting portion 50L is an example of a second converting portion in the present disclosure.

Next, explanation follows regarding operation of the first exemplary embodiment. During travel of the coupled vehicles 10, when the towing vehicle 12 is accelerating or traveling at a constant speed, the extending and contracting portion 44 is in an extended state, and a state in which the gap d is formed between the distal end portion of the rotation member 46 and the protrusion 36A of the guide member 36 is maintained. Accordingly, even if the towing vehicle 12 turns to the left or the right in this state and there is a hitch angle between the towing vehicle 12 and the towed vehicle 18, the rotation member 46 is not rotated, and no braking force is generated at the braking devices 24L and 24R.

Figure 5:
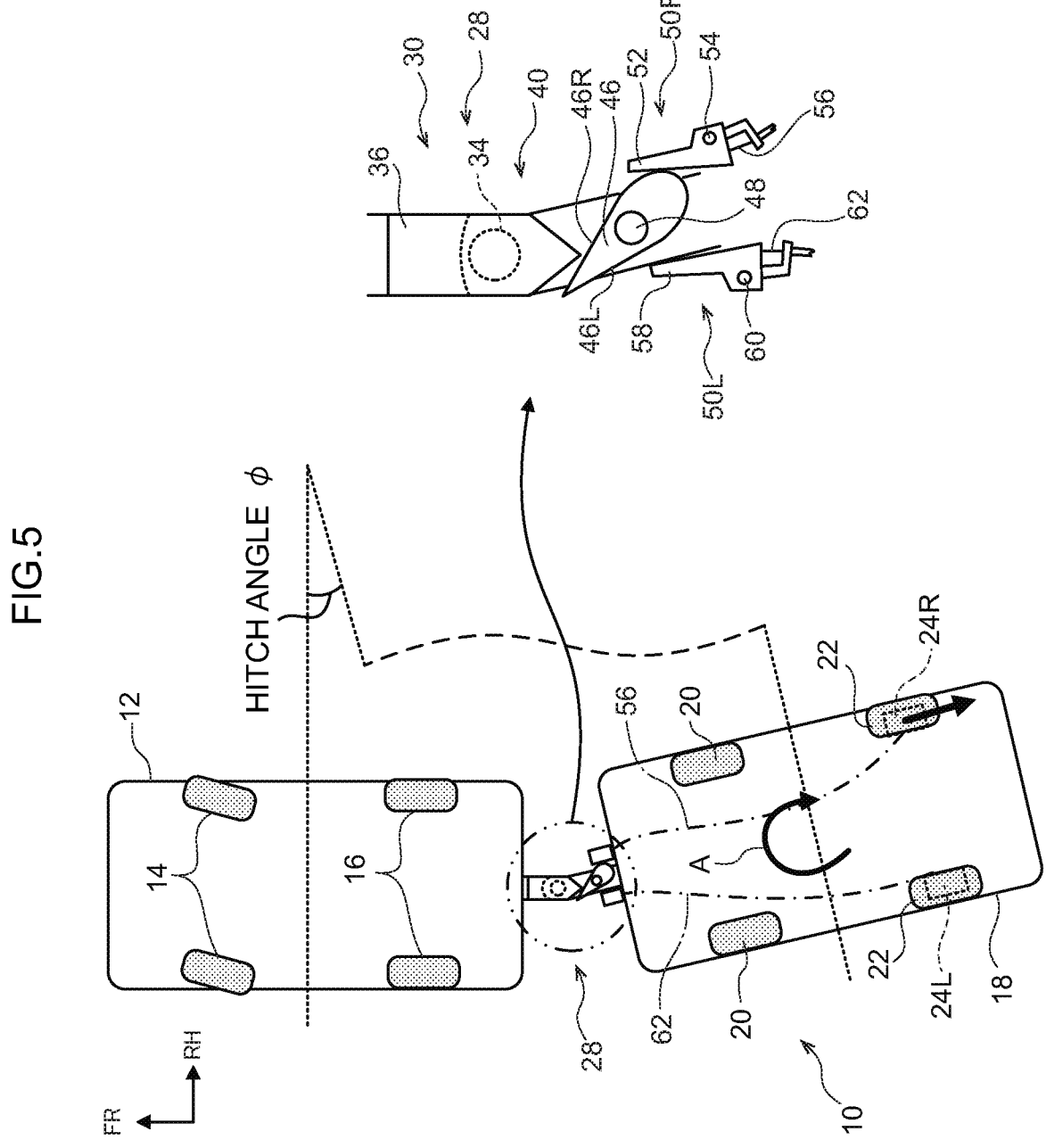
FIG. 5 is a schematic diagram illustrating operation in a case of decelerated rightward turning in the first exemplary embodiment.

On the other hand, in a case of decelerated rightward turning in which the towing vehicle 12 (the coupled vehicles 10) turns to the right while decelerating, the extending and contracting portion 44 contracts, and due to there being a hitch angle φ (see FIG. 5) between the towing vehicle 12 and the towed vehicle 18 (φ≠0), the inclined surface 46R of the rotation member 46 abuts and is pressed against the protrusion 36A of the guide member 36. Along with this, as illustrated in FIG. 5, the rotation member 46 is rotated counterclockwise in accordance with the hitch angle φ, the lever 52 of the displacement converting portion 50R is rotated in accordance with the hitch angle φ, and the first wire 56 is pulled in accordance with the hitch angle 9, such that a braking force is generated only at the braking device 24R (a left-right braking force difference is generated).

This enables a moment in a direction that decreases the hitch angle φ between the towing vehicle 12 and the towed vehicle 18 (see arrow A in FIG. 5) to be generated at the towed vehicle 18 in a case of decelerated rightward turning of the coupled vehicles 10 and unstable behavior such as bending of the coupled vehicles 10 to be suppressed, thereby enabling stability in a case of decelerated rightward turning of the coupled vehicles 10 to be improved.

Moreover, in a case of decelerated leftward turning in which the towing vehicle 12 (the coupled vehicles 10) turns to the left while decelerating, the extending and contracting portion 44 contracts, and due to there being a hitch angle T between the towing vehicle 12 and the towed vehicle 18 in a direction opposite to the decelerated rightward turn, the inclined surface 46L of the rotation member 46 abuts and is pressed against the protrusion 36A of the guide member 36. Along with this, although not illustrated in the drawings, the rotation member 46 is rotated clockwise in accordance with the hitch angle φ, the lever 58 of the displacement converting portion 50L is rotated in accordance with the hitch angle φ, and the second wire 62 is pulled in accordance with the hitch angle φ, such that a braking force is generated only at the braking device 24L (a left-right braking force difference is generated).

This enables a moment in a direction that decreases the hitch angle φ between the towing vehicle 12 and the towed vehicle 18 to be generated at the towed vehicle 18 in a case of decelerated leftward turning of the coupled vehicles 10 and unstable behavior such as bending of the coupled vehicles 10 to be suppressed, thereby enabling stability in a case of decelerated leftward turning of the coupled vehicles 10 to be improved.

As described above, the deceleration turning assistance device according to the first exemplary embodiment includes the braking devices 24L and 24R respectively provided at each of the left wheel and the right wheel of the towed vehicle 18 that is pivotably coupled to the towing vehicle 12 via the coupling portion 28, and the braking force difference generating portion (the rotation member 46, the displacement converting portions 50L and 50R, the first wire 56, and the second wire 62) that generates a left-right braking force difference in accordance with the hitch angle φ at the braking devices 24L and 24R so as to decrease the hitch angle φ between the towing vehicle 12 and the towed vehicle 18 in a case of decelerated turning in a state in which the towed vehicle 18 is coupled to the towing vehicle 12. This enables stability in a case of decelerated turning of the coupled vehicles 10, in which the towing vehicle 12 and the towed vehicle 18 are pivotably coupled via the coupling portion 28, to be improved.

Moreover, in the first exemplary embodiment, the braking force difference generating portion includes the rotation member 46 that is displaced in accordance with the hitch angle φ between the towing vehicle 12 and the towed vehicle 18 in a case of decelerated turning, and the transmitting portion (the displacement converting portions 50L and 50R, the first wire 56, and the second wire 62) that transmits displacement (rotation) of the rotation member 46 to the braking devices 24L and 24R so as to generate a braking force difference at the braking devices 24L and 24R which decreases the hitch angle φ. This enables stability in a case of decelerated turning of the coupled vehicles 10 to be improved with a simple configuration that does not require a control portion or the like.

Moreover, in the first exemplary embodiment, the transmitting portion includes a first converting portion (the displacement converting portion 50R) that converts displacement (rotation) of the rotation member 46 in a case of decelerated rightward turning to a pulling force of the first wire 56, and uses the pulling force of the first wire 56 to increase a braking force generated at the braking device 24R at the right wheel of the towed vehicle 18, and a second converting portion (the displacement converting portion 50L) that converts displacement (rotation) of the rotation member 46 in a case of decelerated leftward turning to a pulling force of the second wire 62, and uses the pulling force of the second wire 62 to increase a braking force generated at the braking device 24L at the left wheel of the towed vehicle 18. This enables stability in a case of decelerated turning of the coupled vehicles 10 to be improved with a simple configuration in a case in which the braking devices 24L and 24R are mechanical.

Second Exemplary Embodiment

Next, explanation follows regarding a second exemplary embodiment of the present disclosure. Note that the same reference numerals are allocated to the same portions as those in the first exemplary embodiment, and explanation thereof is omitted.

Figure 6:
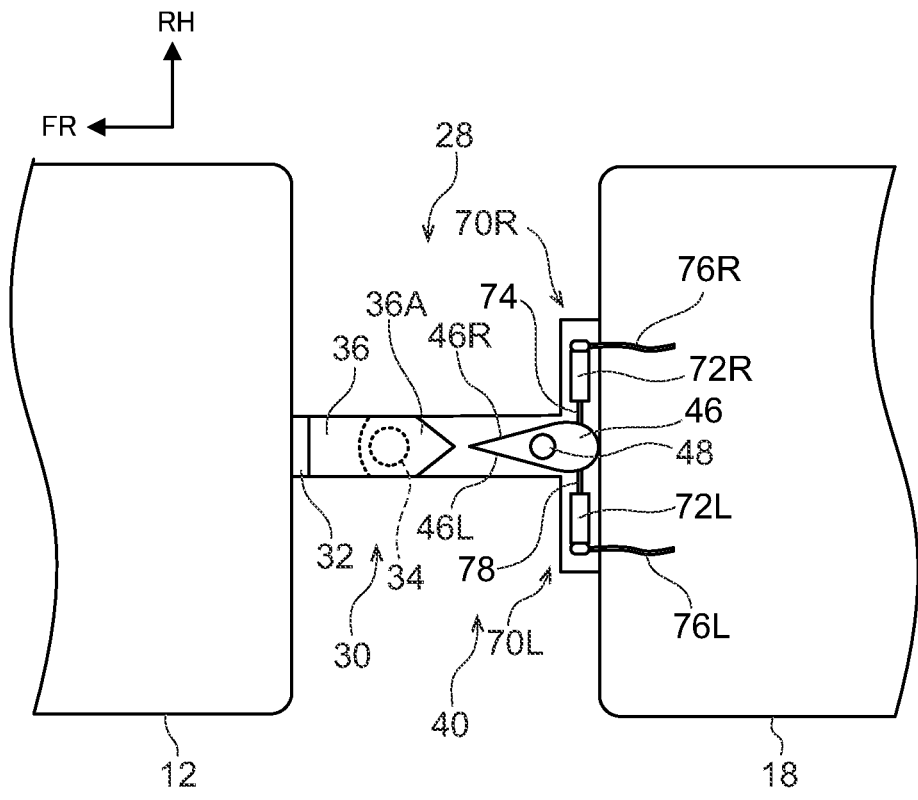
FIG. 6 is a plan view of a coupling portion according to a second exemplary embodiment.

In the second exemplary embodiment, the braking devices 24L and 24R that are provided at the towed vehicle 18 are configured by hydraulic braking devices. Moreover, in the second exemplary embodiment, as illustrated in FIG. 6, a displacement converting portion 70R, which includes a hydraulic cylinder 72R and a hydraulic pipe 76R, is provided instead of the displacement converting portion 50R, and a displacement converting portion 70L, which includes a hydraulic cylinder 72L and a hydraulic pipe 76L, is provided instead of the displacement converting portion 50L.

The hydraulic cylinder 72R is disposed such that a distal end portion of a piston rod 74 abuts the right side surface of the rear end side of the rotation member 46, and when the piston rod 74 is pressed by the rotation member 46, generates hydraulic pressure in accordance with the amount of pressing of the piston rod 74. One end of the hydraulic pipe 76R is connected to the hydraulic cylinder 72R, and the other end of the hydraulic pipe 76R is connected to the braking device 24R (not illustrated), and the hydraulic pipe 76R supplies the hydraulic pressure generated at the hydraulic cylinder 72R to the braking device 24R.

The hydraulic cylinder 72L is disposed such that a distal end portion of a piston rod 78 abuts the left side surface of the rear end side of the rotation member 46, and when the piston rod 78 is pressed by the rotation member 46, generates hydraulic pressure in accordance with the amount of pressing of the piston rod 78. One end of the hydraulic pipe 76L is connected to the hydraulic cylinder 72L, and the other end of the hydraulic pipe 76L is connected to the braking device 24L, and the hydraulic pipe 76L supplies the hydraulic pressure generated at the hydraulic cylinder 72L to the braking device 24L.

Note that in the second exemplary embodiment, the rotation member 46, the displacement converting portion 70R, which includes the hydraulic pipe 76R, and the displacement converting portion 70L, which includes the hydraulic pipe 76L, are examples of a braking force difference generating portion in the present disclosure. Moreover, in the second exemplary embodiment, the rotation member 46 is an example of a displacement portion in the present disclosure, and the displacement converting portions 70L and 70R are examples of a transmitting portion in the present disclosure. Moreover, in the second exemplary embodiment, the displacement converting portion 70R is an example of a third converting portion in the present disclosure, and the displacement converting portion 70L is an example of a fourth converting portion in the present disclosure.

Figure 7:
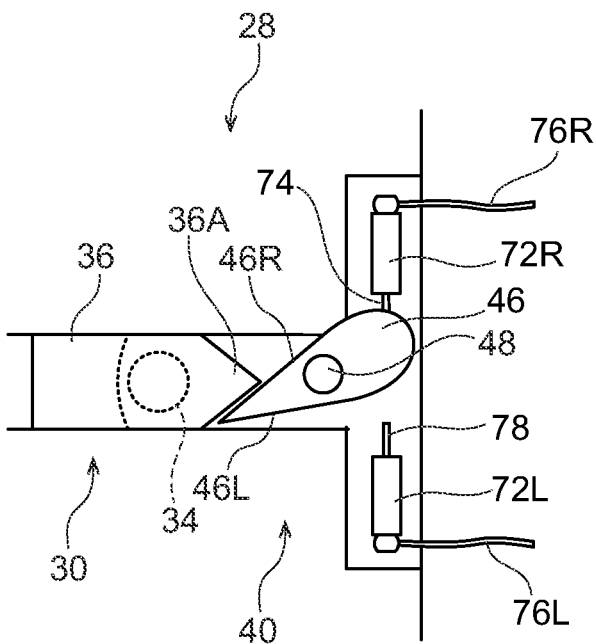
FIG. 7 is a plan view of a coupling portion illustrating a state in a case of decelerated turning in the second exemplary embodiment.

Explanation follows regarding operation of the second exemplary embodiment. As illustrated in FIG. 7, in a case of decelerated rightward turning of the towing vehicle 12 (the coupled vehicles 10), the extending and contracting portion 44 contracts and there is a hitch angle (p between the towing vehicle 12 and the towed vehicle 18 such that the rotation member 46 is rotated counterclockwise in accordance with the hitch angle φ. Along with this, the piston rod 74 of the displacement converting portion 70R is pressed in accordance with the hitch angle φ, and the hydraulic pressure generated at the hydraulic cylinder 72R is supplied to the braking device 24R, such that a braking force is generated only at the braking device 24R (a left-right braking force difference is generated). This enables a moment in a direction that decreases the hitch angle φ between the towing vehicle 12 and the towed vehicle 18 to be generated at the towed vehicle 18 in a case of decelerated rightward turning of the coupled vehicles 10 and unstable behavior such as bending of the coupled vehicles 10 to be suppressed, thereby enabling stability in a case of decelerated rightward turning of the coupled vehicles 10 to be improved.

Moreover, in a case of decelerated leftward turning of the towing vehicle 12 (the coupled vehicles 10), the extending and contracting portion 44 contracts, and there is a hitch angle φ between the towing vehicle 12 and the towed vehicle 18, such that the rotation member 46 is rotated clockwise in accordance with the hitch angle φ. Along with this, the piston rod 78 of the displacement converting portion 70L is pressed in accordance with the hitch angle φ, and the hydraulic pressure generated at the hydraulic cylinder 72L is supplied to the braking device 24L, such that a braking force is generated only at the braking device 24L (a left-right braking force difference is generated). This enables a moment in a direction that decreases the hitch angle φ between the towing vehicle 12 and the towed vehicle 18 to be generated at the towed vehicle 18 in a case of decelerated leftward turning of the coupled vehicles 10 and unstable behavior such as bending of the coupled vehicles 10 to be suppressed, thereby enabling stability in a case of decelerated leftward turning of the coupled vehicles 10 to be improved.

As described above, in the second exemplary embodiment, the transmitting portion includes the third converting portion (the displacement converting portion 70R) that converts the displacement (rotation) of the rotation member 46 in a case of decelerated rightward turning to hydraulic pressure and increases the braking force generated at the braking device 24R at the right wheel of the towed vehicle 18 using this hydraulic pressure, and the fourth converting portion (the displacement converting portion 70L) that converts the displacement (rotation) of the rotation member 46 in a case of decelerated leftward turning to hydraulic pressure and increases the braking force generated at the braking device 24L at the left wheel of the towed vehicle 18 using this hydraulic pressure. This enables stability in a case of decelerated turning of the coupled vehicles 10 to be improved with a simple configuration in a case in which the braking devices 24L and 24R are hydraulic.

Third Exemplary Embodiment

Next, explanation follows regarding a third exemplary embodiment of the present disclosure. Note that the same reference numerals are allocated to the same portions as those in the second exemplary embodiment, and explanation thereof is omitted.

Figure 8:
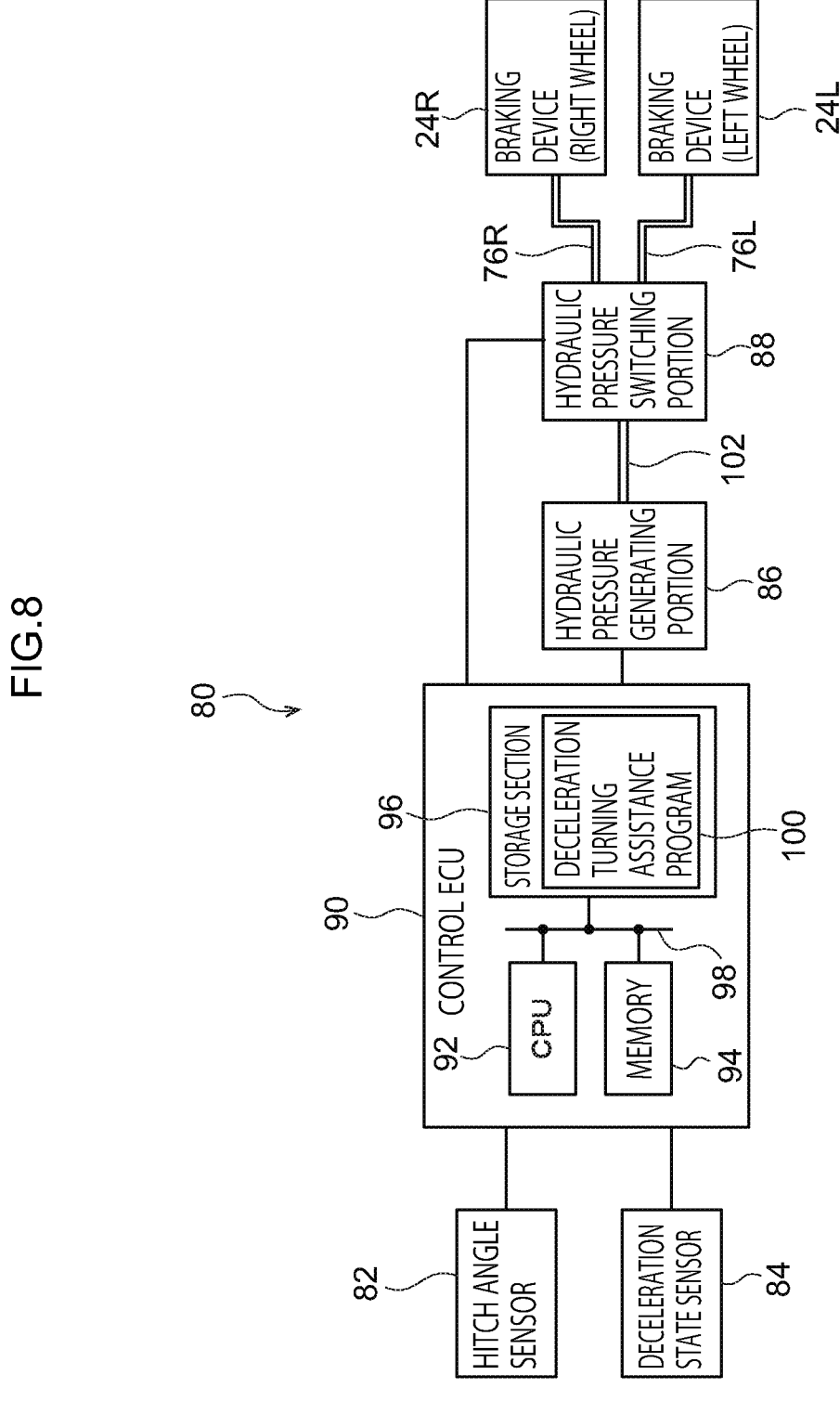
FIG. 8 is a schematic block diagram illustrating a configuration of a braking force difference generating device according to a third exemplary embodiment.

In the third exemplary embodiment, the rotation member 46 and the displacement converting portions 70L and 70R are omitted, and instead, a braking force difference generating device 80 illustrated in FIG. 8 is provided at the towed vehicle 18. The braking force difference generating device 80 includes a hitch angle sensor 82, a deceleration state sensor 84, a control ECU 90, a hydraulic pressure generating portion 86, and a hydraulic pressure switching portion 88. Note that the braking force difference generating device 80 is an example of a braking force difference generating portion in the present disclosure.

The hitch angle sensor 82 is configured by a rotary encoder or the like provided at the coupling portion 28, detects a hitch angle φ between the towing vehicle 12 and the towed vehicle 18, and outputs a detection result of the hitch angle φ to the control ECU 90. Note that in the present exemplary embodiment, in a case in which the coupled vehicles 10 are not turning, the hitch angle φ detected by the hitch angle sensor 82 is 0. Moreover, in a case in which the coupled vehicles 10 are in a turning state, the positive and negative signs of the hitch angle φ detected by the hitch angle sensor 82 differ depending on whether the coupled vehicles 10 are turning rightward or leftward. The hitch angle sensor 82 is an example of a hitch angle detection portion in the present disclosure.

The deceleration state sensor 84 is a sensor that detects whether or not the towing vehicle 12 is in a deceleration state, and outputs a detection result to the control ECU 90.

The deceleration state sensor 84 may be, for example, an acceleration sensor that detects acceleration of the towing vehicle 12, a switch that detects brake operation in the towing vehicle 12, or a sensor that detects whether or not the extending and contracting portion 44 is in a contracted state.

The hydraulic pressure generating portion 86 includes a motor and a pump that generates hydraulic pressure using a drive force of the motor, and is connected to the hydraulic pressure switching portion 88 via a hydraulic pipe 102. The hydraulic pressure generating portion 86 generates hydraulic pressure of a magnitude corresponding to an instruction from the control ECU 90, and supplies the generated hydraulic pressure to the hydraulic pressure switching portion 88.

The hydraulic pressure switching portion 88 is connected to the braking device 24R via the hydraulic pipe 76R, and is also connected to the braking device 24L via the hydraulic pipe 76L. The hydraulic pressure switching portion 88 switches whether to supply the hydraulic pressure supplied from the hydraulic pressure generating portion 86 to the braking device 24R via the hydraulic pipe 76R or to supply the hydraulic pressure supplied from the hydraulic pressure generating portion 86 to the braking device 24L via the hydraulic pipe 76L, in response to an instruction from the control ECU 90.

The control ECU 90 includes a central processing unit (CPU) 92, memory 94 such as read only memory (ROM) or random access memory (RAM), and a non-volatile storage section 96 such as a hard disk drive (HDD) or solid state drive (SSD). The CPU 92, the memory 94, and the storage section 96 are each connected to an internal bus 98 so as to be capable of communicating with each other.

The storage section 96 holds a deceleration turning assistance program 100. The control ECU 90 performs deceleration turning assistance processing (see FIG. 9), described below, by the deceleration turning assistance program 100 being read from the storage section 96 and loaded in the memory 94, and the deceleration turning assistance program 100 that has been loaded in the memory 94 being executed by the CPU 92.

Figure 9:
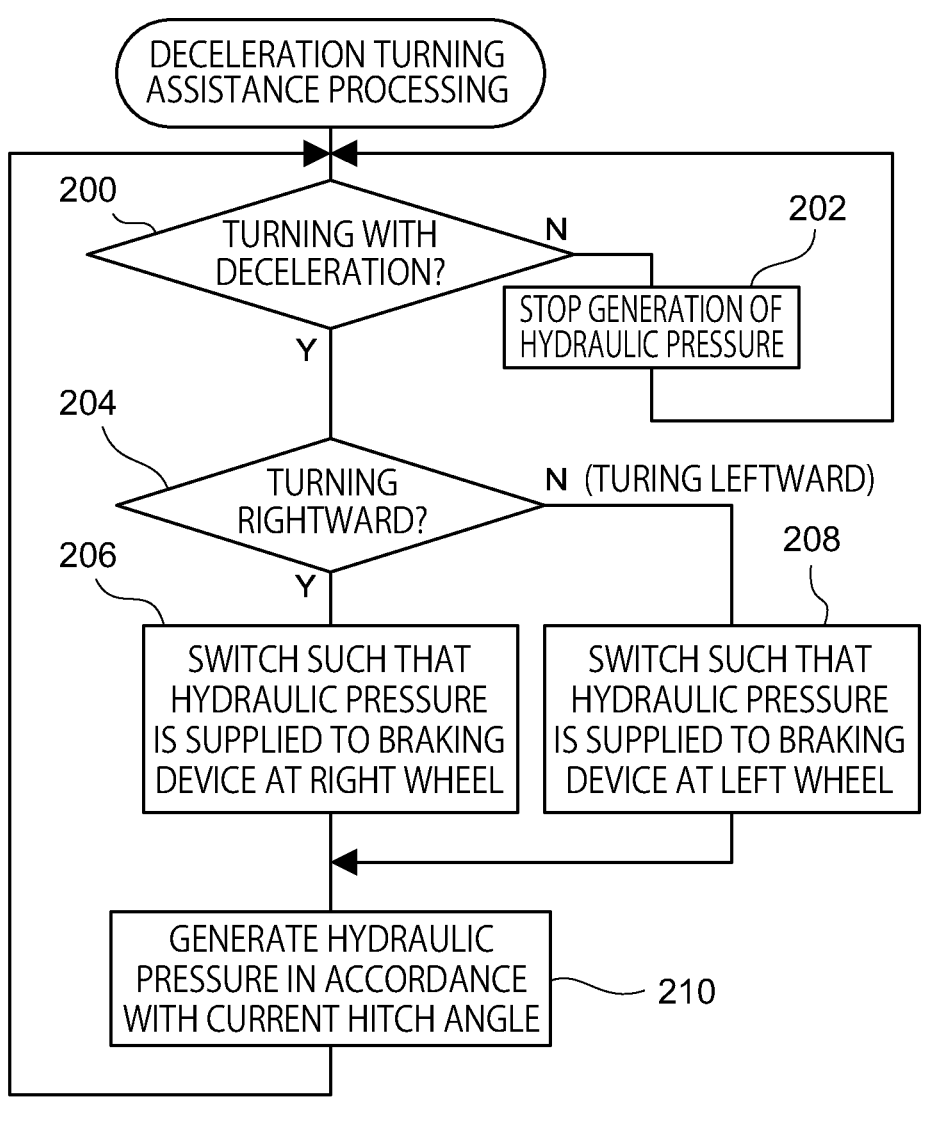
FIG. 9 is a flowchart illustrating deceleration turning assistance processing executed by a control ECU.

Next, explanation follows regarding operation of the third exemplary embodiment, with reference to FIG. 9, regarding deceleration turning assistance processing executed by the control ECU 90 while the coupled vehicles 10 are traveling.

At step 200 of the deceleration turning assistance processing, the control ECU 90 determines whether or not the coupled vehicles 10 (the towing vehicle 12) are turning with deceleration based on whether or not the hitch angle (p detected by the hitch angle sensor 82 does not equal 0, and also whether or not a deceleration state of the towing vehicle 12 has been detected by the deceleration state sensor 84. In a case in which the determination of step 200 is negative, the processing transitions to step 202, and the control ECU 90 stops the generation of hydraulic pressure at the hydraulic pressure generating portion 86 at step 202. When the processing of step 202 is performed, processing returns to step 200, and steps 200 and 202 are repeated until the determination of step 200 is affirmative.

In a case in which the hitch angle (p that has been detected by the hitch angle sensor 82 does not equal 0, and a deceleration state of the towing vehicle 12 has been detected by the deceleration state sensor 84, the determination of step 200 is affirmative, and the processing transitions to step 204. At step 204, based on the positive or negative sign of the hitch angle φ that has been detected by the hitch angle sensor 82, the control ECU 90 determines whether or not the coupled vehicles 10 (the towing vehicle 12) are turning rightward with deceleration.

In a case in which the determination of step 204 is affirmative, the processing transitions to step 206. At step 206, the control ECU 90 switches the hydraulic pressure switching portion 88 such that hydraulic pressure is supplied to the braking device 24R at the right wheel. In a case in which the determination of step 204 is negative (in a case in which the coupled vehicles 10 (the towing vehicle 12) are turning leftward with deceleration), the processing transitions to step 208. At step 208, the control ECU 90 switches the hydraulic pressure switching portion 88 such that hydraulic pressure is supplied to the braking device 24L at the left wheel.

Figure 10:
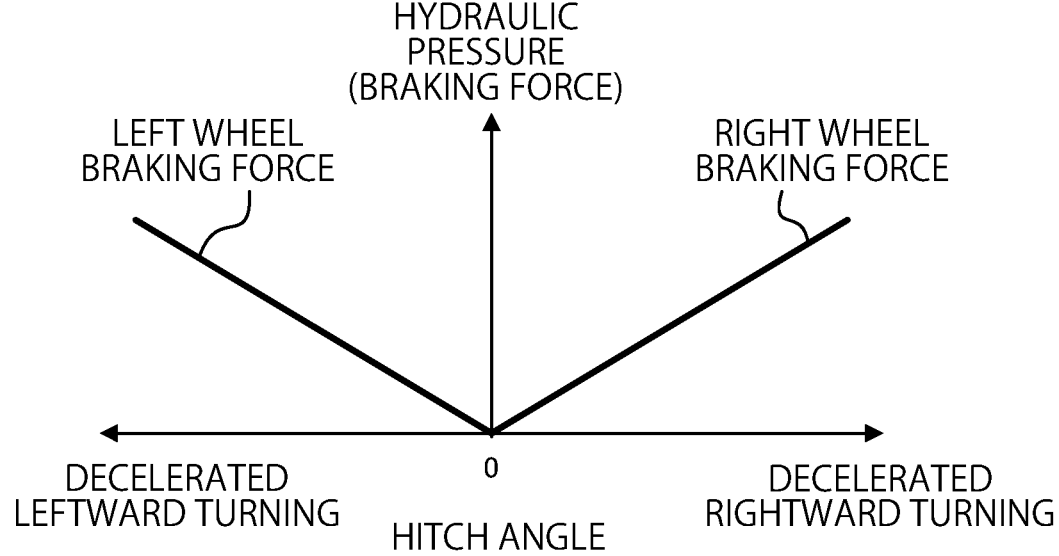
FIG. 10 is a diagram illustrating an example of a relationship between a hitch angle and hydraulic pressure (braking force).

At step 210, the control ECU 90 causes the hydraulic pressure generating portion 86 to generate hydraulic pressure in accordance with the magnitude of the current hitch angle 9 that has been detected by the hitch angle sensor 82. Note that as an example, as illustrated in FIG. 10, the hydraulic pressure generated at the hydraulic pressure generating portion 86 may be set to a magnitude that is directly proportional to (the absolute value of) the hitch angle $\varphi$. However, the present disclosure is not limited to this, and for example, the hydraulic pressure may be changed non-linearly with respect to a change in the hitch angle $\varphi$. After performing the processing of step 210, the processing returns to step 200.

By the above processing, in a case of decelerated rightward turning of the towing vehicle 12 (the coupled vehicles 10), a hydraulic pressure in accordance with the hitch angle $\varphi$ is generated at the hydraulic pressure generating portion 86, and the generated hydraulic pressure is supplied to the braking device 24R via the hydraulic pressure switching portion 88 and the hydraulic pipe 76R, such that a braking force is generated only at the braking device 24R (a left-right braking force difference is generated). This enables a moment in a direction that decreases the hitch angle $\varphi$ between the towing vehicle 12 and the towed vehicle 18 to be generated at the towed vehicle 18 in a case of decelerated rightward turning of the coupled vehicles 10 and unstable behavior such as bending of the coupled vehicles 10 to be suppressed, thereby enabling stability in a case of decelerated rightward turning of the coupled vehicles 10 to be improved.

Moreover, in a case of decelerated leftward turning of the towing vehicle 12 (the coupled vehicles 10), a hydraulic pressure in accordance with the hitch angle $\varphi$ is generated at the hydraulic pressure generating portion 86, and the generated hydraulic pressure is supplied to the braking device 24L via the hydraulic pressure switching portion 88 and the hydraulic pipe 76L, such that a braking force is generated only at the braking device 24L (a left-right braking force difference is generated). This enables a moment in a direction that decreases the hitch angle $\varphi$ between the towing vehicle 12 and the towed vehicle 18 to be generated at the towed vehicle 18 in a case of decelerated leftward turning of the coupled vehicles 10 and unstable behavior such as bending of the coupled vehicles 10 to be suppressed, thereby enabling stability in a case of decelerated leftward turning of the coupled vehicles 10 to be improved.

As described above, in the third exemplary embodiment, the braking force difference generating device 80 includes a hitch angle sensor 82 that detects the hitch angle q between the towing vehicle 12 and the towed vehicle 18, and a control portion (the control ECU 90, the hydraulic pressure generating portion 86, and the hydraulic pressure switching portion 88) that causes a left-right braking force difference to be generated at the braking devices 24L and 24R in accordance with the hitch angle $\varphi$ that has been detected by the hitch angle sensor 82 so as to decrease the hitch angle $\varphi$ in a case of decelerated turning. This enables stability in a case of decelerated turning of the coupled vehicles 10 to be improved.

Although explanation has been given regarding a case in which the number of axles of the towed vehicle 18 is two in the above-described exemplary embodiments, the present disclosure is not limited to this, and the number of axles of the towed vehicle 18 may be one or three or more. Similarly, although explanation has been given regarding a case in which the number of axles of the towing vehicle 12 is two in the above-described exemplary embodiments, the present disclosure is not limited to this, and the number of axles of the towing vehicle 12 may be one or three or more.

What is claimed is:

1. A deceleration turning assistance device comprising:
   braking devices respectively provided at each of a left wheel and a right wheel of a towed vehicle that is configured to be pivotably coupled to a towing vehicle via a coupling portion; and
   a braking force difference generating portion that, in a case of decelerated turning in a state in which the towed vehicle is coupled to the towing vehicle, is configured to generate a left-right braking force difference between the braking devices in accordance with a hitch angle between the towing vehicle and the towed vehicle so as to decrease the hitch angle,
   wherein the braking force difference generating portion comprises,
   a displacement portion that is configured to be displaced in a case of decelerated turning, in accordance with the hitch angle; and
   a transmitting portion that is configured to transmit displacement of the displacement portion to the braking devices so as to generate the left-right braking force difference between the braking devices, which decreases the hitch angle.

2. The deceleration turning assistance device according to claim 1, wherein the transmitting portion comprises:
   a first converting portion that is configured to convert displacement of the displacement portion to a pulling force of a first wire in a case of decelerated rightward turning, and to increase a braking force generated at a braking device at the right wheel of the towed vehicle by the pulling force of the first wire; and
   a second converting portion that is configured to convert displacement of the displacement portion to a pulling force of a second wire in a case of decelerated leftward turning, and to increase a braking force generated at a braking device at the left wheel of the towed vehicle by the pulling force of the second wire.

3. The deceleration turning assistance device according to claim 1, wherein the transmitting portion comprises:
   a third converting portion that is configured to convert displacement of the displacement portion to hydraulic pressure in a case of decelerated rightward turning, and to increase a braking force generated at a braking device at the right wheel of the towed vehicle by the hydraulic pressure; and
   a fourth converting portion that is configured to convert displacement of the displacement portion to hydraulic pressure in a case of decelerated leftward turning, and to increase a braking force generated at a braking device at the left wheel of the towed vehicle by the hydraulic pressure.

4. The deceleration turning assistance device according to claim 1, wherein the braking force difference generating portion comprises:

a hitch angle detection portion that is configured to detect the hitch angle; and a control portion that, in a case of decelerated turning, is configured to generate the left-right braking force difference between the braking devices in accordance with the hitch angle detected by the hitch angle detection portion so as to decrease the hitch angle between the towing vehicle and the towed vehicle.

5. A towed vehicle comprising the deceleration turning assistance device according to claim 1, wherein the towed vehicle is configured to be pivotably coupled to a towing vehicle via a coupling portion.

6. Coupled vehicles comprising:

the towed vehicle according to claim 5; and a towing vehicle that is configured to be pivotably coupled to the towed vehicle via the coupling portion.

\* \* \* \* \*